(12) United States Patent
Monteux et al.

(10) Patent No.: US 9,792,037 B2
(45) Date of Patent: Oct. 17, 2017

(54) MOBILE TERMINAL WITH A TOUCH SCREEN THAT DISPLAYS A STACK OF PAGES

(75) Inventors: Guillaume Monteux, Paris (FR); Nicolas Rucine, Nantes (FR); Raphaël Monrouzeau, Maisons Alfort (FR); Luc Vauvillier, Le Plessis-Bouchard (FR)

(73) Assignee: MILIBRIS, Paris (FR)

( * ) Notice: Subject to any disclaimer, the term of this patent is extended or adjusted under 35 U.S.C. 154(b) by 524 days.

(21) Appl. No.: 13/394,929

(22) PCT Filed: Sep. 13, 2010

(86) PCT No.: PCT/EP2010/063367
§ 371 (c)(1),
(2), (4) Date: Oct. 18, 2012

(87) PCT Pub. No.: WO2011/029927
PCT Pub. Date: Mar. 17, 2011

(65) Prior Publication Data
US 2013/0033438 A1  Feb. 7, 2013

(30) Foreign Application Priority Data
Sep. 11, 2009 (FR) ..................... 09 56280

(51) Int. Cl.
*G06F 3/041* (2006.01)
*G06F 3/0488* (2013.01)
*G06F 3/0483* (2013.01)

(52) U.S. Cl.
CPC ........ *G06F 3/04883* (2013.01); *G06F 3/0483* (2013.01)

(58) Field of Classification Search
CPC .......... G06F 3/01; G06F 3/048; G06F 3/0483; G06F 3/04883
(Continued)

(56) References Cited

U.S. PATENT DOCUMENTS 5,463,725 A      10/1995  Henckel et al.
2003/0020687 A1*  1/2003  Sowden et al. ............... 345/157
(Continued)

FOREIGN PATENT DOCUMENTS

EP     1 058 181        12/2000
EP     2 000 894 A2     12/2008
WO     WO 2008/000435    1/2008

OTHER PUBLICATIONS

Nitro_PDF_Professional_6x_User_Guide_p. 14 (p. 14 of "Nitro PDF Professional User Guide" version 6. Downloadable from web. published 2010).*
(Continued)

*Primary Examiner* — Amr Awad
*Assistant Examiner* — Wing Chow
(74) *Attorney, Agent, or Firm* — Pillsbury Winthrop Shaw Pittman LLP (57) ABSTRACT

A mobile terminal with a touch screen includes a browsing and searching system that reproduces the sensation of leafing through a work on paper and a read mode that does not alter the structure or layout of the original page. The main benefit of this solution is that it can be used to read a digital publication in the same manner as the equivalent paper version, both in terms of leafing and reading, while taking account of the technical specifications of the read terminal.

9 Claims, 6 Drawing Sheets

(58) Field of Classification Search
USPC .......................................................... 345/173
See application file for complete search history.

(56) References Cited

U.S. PATENT DOCUMENTS

2007/0083828 A1* 4/2007 Toriyama et al. ............ 715/816
2008/0079692 A1* 4/2008 Liang et al. .................. 345/156
2008/0088617 A1   4/2008 Izumida

OTHER PUBLICATIONS

Nitro_pdf_professional_5x_user_guide_p. 14.*
Nitro-pro-5_releaseNote.*
NitroPDF5 : ProQuest search result showing Nitro PDF Professional version 5 was cited by Business Wire [New York] May 10, 2007 and Accounting Technology 23.6 (Jul. 2007).*
BusinessWire_May 10, 2007.*
AccountingTech_Jul. 2007.*
International Search Report as issued for PCT/EP2010/063368.

\* cited by examiner figure 1 figure 2 figure 3 figure 4 figure 5 figure 6 figure 7 figure 8 figure 9 figure 10 figure 11

Figure 12

MOBILE TERMINAL WITH A TOUCH SCREEN THAT DISPLAYS A STACK OF PAGES

CROSS REFERENCE TO RELATED APPLICATIONS

This application is the U.S. National Stage of PCT/EP2010/063367, filed Sep. 13, 2010, which in turn claims priority to French Patent Application No. 0956280, filed Sep. 11, 2009, the entire contents of all applications are incorporated herein by reference in their entireties.

TECHNICAL FIELD OF THE INVENTION

The present invention relates to a mobile terminal with a touch screen. The invention is situated in the field of MMI (Man-Machine Interfaces), applied to digital reading.

TECHNOLOGICAL BACKGROUND OF THE INVENTION

Currently, applications on mobile terminals, by virtue of their reduced display capacity, do not enable content of the press/magazine type to be presented and do not reproduce browsing and reading that are similar to paper use.

Various solutions propose reading in stream mode: The articles are previously extracted and presented in list form comprising the title, a brief description or introductory paragraph to encourage reading and sometimes an associated image. Once the article is selected, the reading mode presents the text of the article in a column whose width is the width of the mobile terminal screen.

However, these solutions present a certain number of disadvantages.

Therefore, none of these solutions take into account the notion of pagination or respect the layout and style guide of the original document.

GENERAL DESCRIPTION OF THE INVENTION

In this context, the present invention aims to provide a terminal with a touch screen in which the issue is to reproduce in terms of use the sensation of reading paper on a mobile terminal and to enable press groups to be able to make their publications paperless by disregarding the material and technical constraints of various reading terminals.

For this purpose, the invention proposes a mobile terminal with a touch screen characterized in that the terminal comprises
    storage means on which a plurality of pages are stored;
    means for displaying in portrait mode a stack of recto pages ordered in the ascending direction belonging to said plurality of stored pages;
    means for pre-loading at least two pages following the page displayed in full on said display means, called the current page, and/or at least two pages preceding said current page, said pre-loadings carried out within the limit of the number of pages preceding and/or following the current page;
    means for controlling said display means comprising
        detection touch means able to detect the placement, sliding and lifting of a finger of a user;
        means for detecting the target page that is defined as being either the current page or the page preceding the current page, depending on the detection of the finger placement;
        means for executing a rotation and/or translation composite of said target page;
        means for going from the current page, called page N, to the next page in the stack, called page N+1, or to the previous page, called page N−1, depending on the detection of the finger lifting.
        means for going from said page N+1 to the page following page N+1, called page N+2, while the passage from page N to page N+1 is in progress;
        means to go from said page N−1 to the page preceding page N−1, called page N−2, while the passage from page N to page N−1 is in progress.

Thanks to the invention, a browsing and searching system that reproduces the sensation of leafing through a work on paper and a read mode that does not alter the structure or layout of the original page is utilized. The main advantage of this solution is that it can be used to read a digital publication in the same manner as the equivalent paper version, both in terms of leafing and reading, while taking account of the technical specifications of the read terminal. No existing solution offers a reading experience of this type. The invention is intended for editors and press groups wishing to disseminate their content on mobile terminals. Therefore, the final user of the invention will be the client who consults the works delivered on his mobile terminal.

Pre-loading of pages is understood to refer to the passage of a page from the storage means to the random access memory of the mobile terminal with a touch screen in view of an instantaneous display of said page.

Stack is understood to refer to a given set of pages displayed some on top of the others on the touch mobile terminal.

Passage is understood to refer to an animation type transition (defined by the composite of a rotation and a translation that is variable over time) when the current page is changed.

Passage from page N to page N+1 or page N−1 is understood to refer to the act of displaying the page following the current page in lieu of the current page or the page preceding the current page in lieu of the current page, all depending on the detection of the lifting of a finger.

The terminal according to the invention may also present one or more, of the characteristics below, considered individually or according to all technically possible combinations:
    said control means comprising:
        means to stop the passage from said page N to the following page, called page N+1, and return from the following page, called page N+1, to the current page, called page N;
        means to stop the passage from said page N to the preceding page, called page N−1, and return from the preceding page, called page N−1, to the current page, called page N;
    said means to go from page N to page N+1 or to page N−1 depending on detecting the lifting of a finger make page N go to page N+1 or to page N−1 provided that the sliding has reached a threshold value;
    said control means comprise means for executing a composite of a variable angle rotation and a variable vector translation, of said target page, these variations being dependent on said detected sliding;
    the mobile terminal according to the invention comprises means to emit a sound effect during passage from the current page to page N+1 or to page N−1.

DETAILED DESCRIPTION OF PREFERRED FORMS OF EMBODIMENT OF THE INVENTION

Other characteristics and advantages of the invention will clearly emerge from the description given below, for indicative and in no way limiting purposes, with reference to the attached FIGS. 1 to 12.

The terminal according to the invention comprises several software means (i.e., applications) dedicated to implementing the invention.

The terminal with a touch screen according to the invention first of all comprises searching means that enable displacement in the digital publication. This method is both visual and gestural. It enables a sensation of leafing to be reproduced on the tactile mobile terminal.

As the display means are generally rectangular, two reading positions will be distinguished, depending on the orientation of the display means: Reading in portrait mode and reading in landscape mode. The reading mode is defined when the application is launched, or if the terminal allows this, automatically depending on the orientation of the terminal.

Portrait Mode

Figure 1:
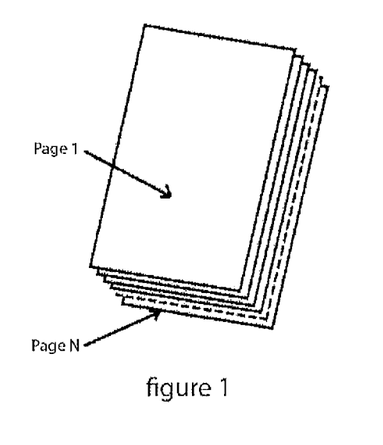
FIG. 1 shows a stack of pages displayed in a portrait mode.
Figure 2:
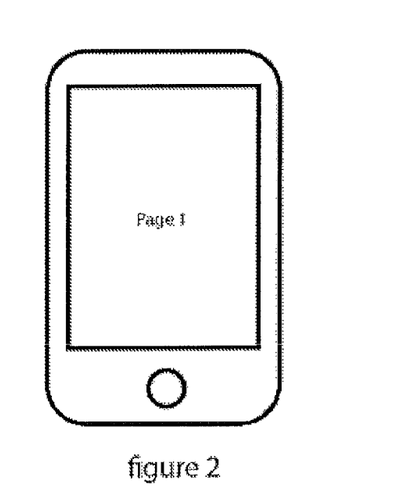
FIG. 2 shows a terminal that displays the stack of page of FIG. 1.

Portrait mode offers the user a layout of digital publication pages in the form of a stack of pages. Each page only comprises a front. Page 1 is situated on top of the stack; the last page (page N) is situated on the bottom of the stack (FIG. 1). The terminal displays the stack seen from above. Only the top page is visible (FIG. 2).

Figure 3:
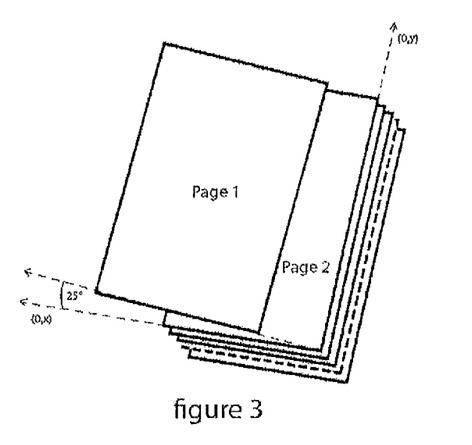
FIG. 3 shows a passage from one page to another in the stack of pages according to an embodiment.
Figure 4:
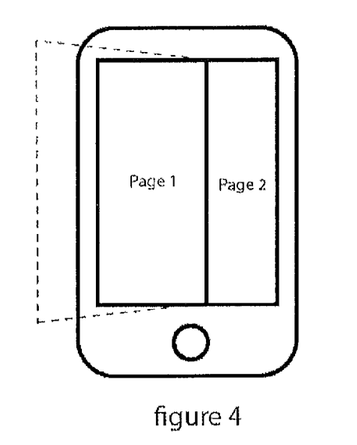
FIG. 4 shows a terminal that displays a passage from one page to another in the stack of pages according to an embodiment.

Passage from one page to another is done visually through animation. To go to the following page, the top page of the stack slides leftward and then leaves the terminal screen, revealing the page underneath. To improve the visual rendering of the transition and retranscribe a sensation of real page riffling (separation of the page), the movement is composed of both a negative translation on the X axis equal to the width of the page as well as a rotation having the right edge of the page as the axis and an angle on the order of 25 degrees (FIGS. 3 and 4).

To return to the previous page, the animation takes place in the opposite direction: The previous page arrives from the left and covers the screen during the reverse translation.

Animation Initiation and Control

Page turning is controlled by the user sliding his finger on the touch screen of the terminal. This control means enables both the direction as well as the sequence of the animation to be controlled.

Figure 5:
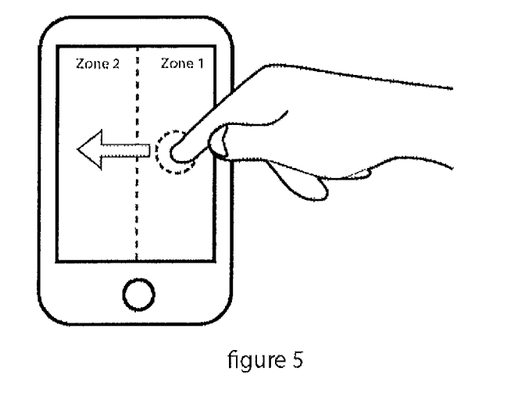
FIG. 5 shows a terminal including two touch zones according to an embodiment.

This process is carried out in 3 steps:
1. The user places his finger
2. The user moves his finger
3. The user lifts his finger Step 1 enables, depending on the start position, the page turning direction to be determined (means to detect the target page). The touch zone is virtually cut vertically into two possible start zones of equal width (FIG. 5). By placing a finger on one of the two zones, the user indicates that he wants to either go to the next page or return to the previous page.

In FIG. 5, the user places his finger in zone 1. The method therefore detects that he requests passage to the next page (respectively, zone 2 enables a return to the previous page).

Figure 6:
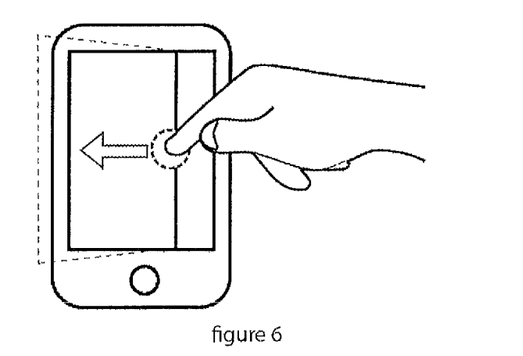
FIG. 6 shows a user moving a page displayed on a terminal according to an embodiment.

When the user slides his finger horizontally, the animation of the page to be displaced (or target page, defined by the start zone) follows his finger. The translation on the axis (O,x) is equal to the displacement deltaX between the start position and the actual position of the finger (FIG. 6).

When the user lifts his finger, animation automatically follows it, either:
- To the final position of the animation if the displacement deltaX is equal to or greater than a minimum displacement.
- To the initial position of the animation if the displacement is less than a minimum displacement. This minimum displacement is equal to 30% of the width of the screen.

An exception to the animation is provided for the last page: For the "next page" command (start in zone 1), a multiplicative factor of 0.5 is applied to deltaX to calculate the translation when the animation is controlled by the finger and, regardless of the deltaX value when the user lifts his finger (if it is greater than or less than the minimum displacement), the page will return to its initial location.

The purpose of this multiplicative factor is to simulate strong friction or resistance to page turning in order to indicate to the reader that this is the last page and that it will not turn.

The complete sequence may be repeated indefinitely. As the end of page turning animation is independent from the control means, another animation can be launched while the previous has not ended, therefore giving the impression of multipage turning.

Landscape Mode

Figure 7:
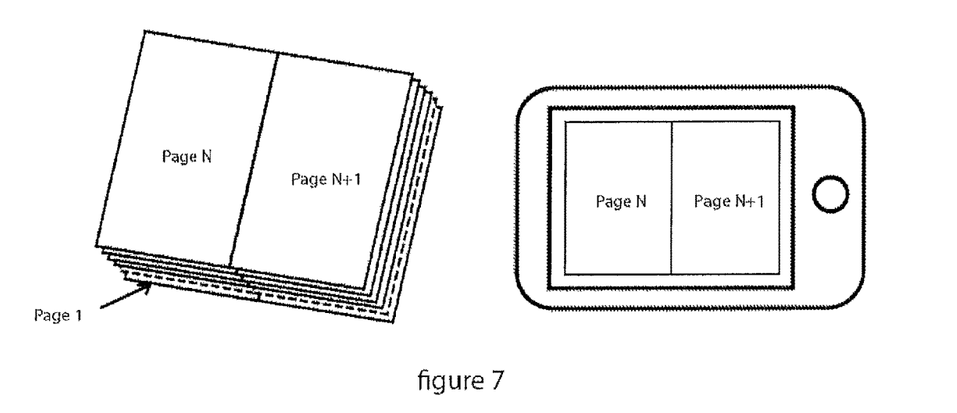
FIG. 7 shows a stack of pages displayed in a landscape mode.

Landscape mode offers the user a representation that is faithful to the work (material representation). Therefore, each page has a front and a back. As the screen is wider, the display means may then present two pages from a digital publication. In concrete terms, the pages are positioned in two side-by-side stacks (FIG. 7). The previous pages are in the stack on the left and the following pages are in the stack on the right. The left stack is ordered in ascending order, while the right stack is in descending order.

Figure 8:
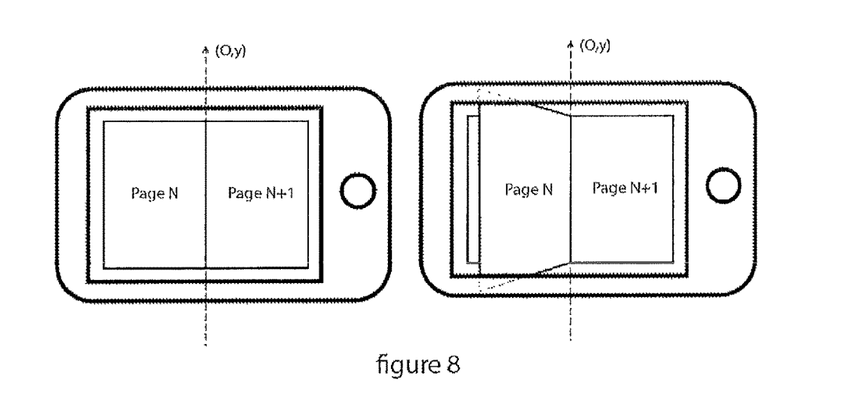
FIG. 8 shows a passage from one page to another in the stack of pages according to an embodiment.
Figure 9:
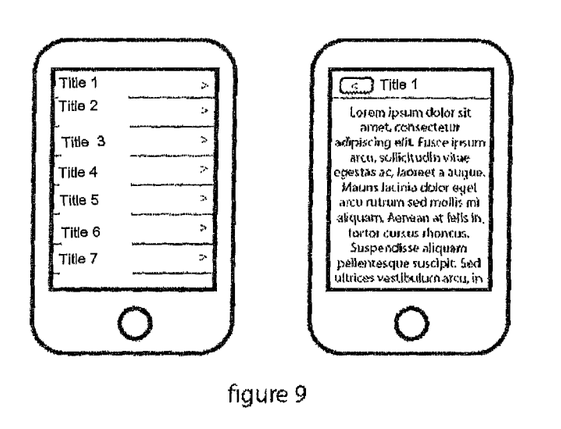
FIG. 9 shows a terminal that displays a list of articles.

Passage from one page to another for this mode: Animation is done by a page turn along the central axis (O,y) in order to faithfully reproduce a real page turn relative to the fold (FIG. 8).

The animation command and control means are based on the same principles as described in the part relating to "animation initiation and control":

The screen is separated into two virtual zones to determine the direction of animation. These zones define the detection means and correspond to the two displayed pages. The touched page becomes the page targeted by the animation.

Animation is controlled by the finger. For this mode, the equation giving the angle of rotation according to the displacement deltaX is: angle=deltaX*180/screen width.

When the finger is lifted, if the minimum distance (30% of the width) is covered, animation to the final value (180°) is initiated, if not, animation to the initial value (0°) is initiated.

It will be noted that there is no exception to the animation for the last page. The "fourth cover page" should be able to be seen.

In addition, for the two modes (portrait and landscape), the edge effects are to be managed. (Example: it is impossible to select a preceding page (zone 2) when on the first page)

Reading Processes

Once the page is located, the terminal according to the invention offers two possibilities to access its content in order to read the page.

Reading in Text Mode

Reading in text mode is initiated by a combination of ergonomic keys or gestures defined according to the reading terminal. Example: Pressing the finger without sliding, dedicated key, etc.

Reading in Text Mode is Done Twice:
A first screen presenting all the titles of the page being read (and only those titles), inviting the reader to select one. If the article includes an image, the image may be associated as a thumbnail image.
A page for reading the selected article.

The list of articles (FIG. 9) can be scrolled downward if the list of articles is long and cannot be displayed in full. In the same way, the text of the article may also be read in full. Scrolling is controlled by sliding the finger vertically on the screen of the terminal.

Reading in Zoom Mode

The reading mode in zoom mode enables reading directly from the searching views.

This mode enables the page to be zoomed in/zoomed out and the page to be displaced as it is displayed; therefore, its formatting is not altered. This reading mode is initiated by a combination of ergonomic keys or gestures defined depending on the terminal (Example: Bringing the fingers closer together/farther apart (if the terminal allows this), double tap of the finger, scroll wheel, up/down keys, etc.).

Figure 10:
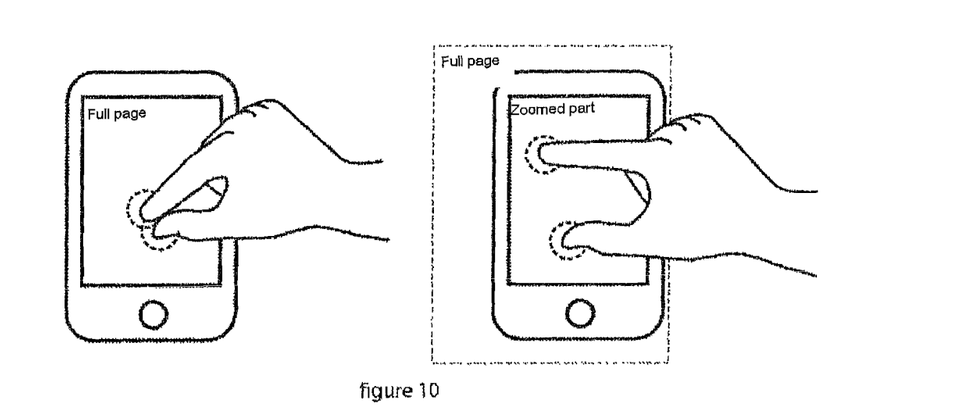
FIG. 10 shows a user performing a zoom reading operation according to an embodiment.
Figure 11:
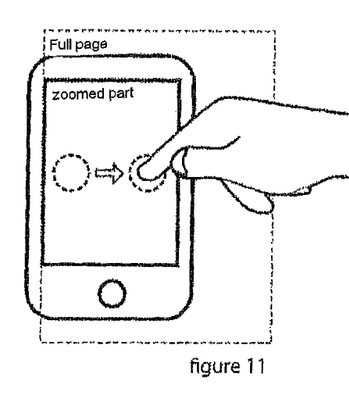
FIG. 11 shows a user performing a zoom reading operation according to an embodiment.

In zoomed reading, only part of the page is displayed (FIG. 10). Therefore displacement in the page is done by sliding the finger (FIG. 11).

Example of Technical Implementation

Figure 12:
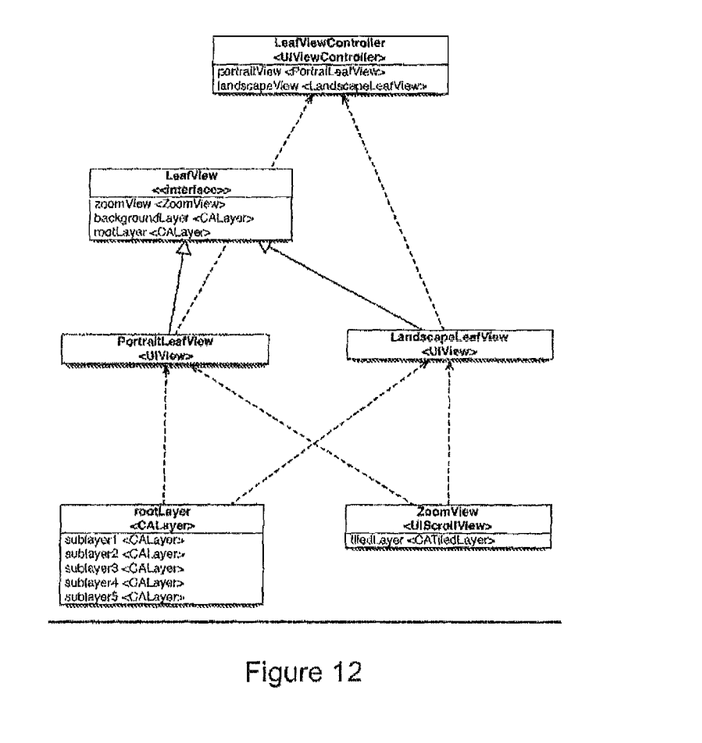
FIG. 12 shows an example of a technical implementation of an embodiment of the invention.

In the case of an iPhone/iPod Touch (Apple, Objective-C programming language) terminal, implementation of the invention may be as follows (cf. FIG. 12):

A "LeafViewController" controller manages the two presentation modes in View form and enables passage from "portraitView" to "landscapeView" according to the orientation of the apparatus.

The two views implement the "LeafView" interface (or protocol) that adds two layers to them: "backgroundLayer" and "rootLayer." The first contains a background image while the second contains sublayers containing pages. They also benefit from a "zoomView" that is displayed over the layers during passage into zoom mode.

Each page layer establishes its content from a source image in PNG or JPEG format zoomView inherits from the UIScrollView class (enables displacement and zooming) and is composed of a tiledLayer: A layer for progressive loading on several zoom levels that will enable the image to be gradually established in high definition by flattening a PDF source.

The meaning of the arrows used in FIG. 12 is given in table 1 below:

TABLE 1

| Solid arrows: "implements" | Between quotation marks: base class |
|---|---|
| Dotted arrows: "is linked to" | Between double quotation marks: interface |

Page Pre-Loading Process

For the sake of performance and memory, all the pages in a stack will not be loaded at once. Only the N pages preceding and following the displayed page will be loaded. N being set and having a minimum value of 2. The stack therefore comprises, outside of edge effects, a minimum of loaded pages. Every time a page is turned, the displayed page changes and the pages are loaded and unloaded according to this new value.

The invention claimed is:
1. A mobile terminal with a touch screen comprising:
a storage device on which a plurality of pages are stored;
a display device configured to display in portrait mode a stack of recto pages ordered in the ascending direction belonging to said plurality of stored pages;
a pre-loading device configured to pre-load at least two pages following a current recto page N displayed in full on said display device and/or at least two recto pages preceding said current recto page N, said pre-loadings carried out within the limit of the number of recto pages preceding and/or following the current recto page;
a controller configured to control said display device, the controller comprising
a detection touch device configured to detect the placement, sliding and lifting of a finger of a user;
a detecting device configured to detect a target recto page that is defined as being either the current recto page N or a recto page preceding the current recto page N, depending on the detection of the finger placement;
an executing device configured to execute a rotation and/or translation composite of said target recto page;
a device for going from the current recto page N to a next recto page N+1 in the stack of recto pages, or to a previous recto page N−1 depending on the detection of the finger lifting;

a device for going from said next recto page N+1 to a recto page N+2 following said next recto page N+1, while the passage from the current recto page N to the next recto page N+1 is in progress;

a device for going from said previous recto page N−1 to a recto page N−2 preceding the previous recto page N−1, while the passage from the current recto page N to the previous recto page N−1 is in progress, wherein an end of page turning animation displayed on the display device is independent of a control of another page turning animation displayed on the display device and launched while said page turning animation has not ended, wherein the mobile terminal is configured so that the passage from the current recto page N to the next recto page N+1 is displayed on the touch screen without displaying a verso of page N and a verso of page N+1.

2. The mobile terminal according to claim 1, wherein said controller comprises:

a device to stop the passage from said current recto page N to the next page N+1, and return from the next recto page N+1, to the current recto page N;

a device to stop the passage from said current recto page N to the previous recto page N−1, and return from the previous recto page N−1, to the current recto page N.

3. The mobile terminal according to claim 1, wherein said device to go from the current recto page N to the next recto page N+1 or to the previous recto page N−1 depending on detecting the lifting of a finger make the current recto page N go to the next recto page N+1 or to the previous recto page N−1 provided that the sliding has reached a threshold value.

4. The mobile terminal according to claim 1, wherein said controller comprises an executing device to execute a composite of a variable angle rotation and a variable vector translation, of said target recto page, the variations being dependent on said detected sliding.

5. The mobile terminal according to claim 1, wherein the terminal comprises an emitting device to emit a sound effect during passage from the current recto page N, to the next recto page N+1 or to the previous recto page N−1.

6. The mobile terminal according to claim 1, wherein the device for going from the current recto page N to the next recto page N+1 is configured to display on the touch screen a simultaneous translation of an entire edge of the current recto page N and a rotation about said entire edge of the current recto page N to show a passage from the current recto page N to the next recto page N+1 on the touch screen.

7. The mobile terminal according to claim 6, wherein the edge is the right edge of the current recto page N.

8. The mobile terminal according to claim 1, wherein the device for going from the current recto page N to the next recto page N+1 is configured to display on the touch screen a simultaneous vector translation of an entire edge of the current recto page N and a rotation about said entire edge of the current recto page N without displaying a verso of page N and a verso of page N+1 to show a passage from the current recto page N to the next recto page N+1 on the touch screen.

9. The mobile terminal according to claim 8, wherein the edge is the right edge of the current recto page N.

* * * * *